March 17, 1959 H. E. AUSTEN 2,877,540

METHOD OF MAKING MAGNETIC DATA STORAGE DEVICES

Original Filed March 29, 1956

INVENTOR
HERMAN E. AUSTEN
BY Louis A Kline
Henry Silverio
HIS ATTORNEYS 2,877,540
Patented Mar. 17, 1959

1

2,877,540

METHOD OF MAKING MAGNETIC DATA STORAGE DEVICES

Herman E. Austen, Trotwood, Ohio, assignor to The National Cash Register Company, Dayton, Ohio, a corporation of Maryland Original application March 29, 1956, Serial No. 573,283. Divided and this application July 16, 1957, Serial No. 672,277

1 Claim. (Cl. 29—155.5)

This invention relates to a method of making magnetic core storage and switching devices, suitable for use in magnetic core matrices of electronic calculating machines, and is a division of application Serial No. 573,283, filed March 29, 1956.

The devices consist of a number of magnetic cores supported on a non-magnetic structure, which holds them in position for easy insertion of electric conductors by which data may be selectively entered into the device or read therefrom. A plurality of the devices may be formed into a coordinate matrix.

The support for a row of the cores may be an electric conductor and may be connected to the supports for other rows of cores forming a matrix and such electrically connected supports may act as one of the electric conductors in the matrix system.

Figure 1:
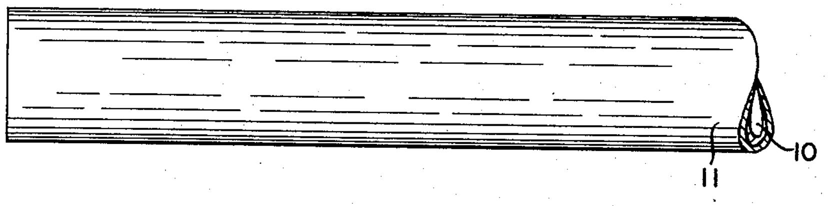
Figs. 1, 2 and 3 show successive steps in making the device.

Referring to Fig. 1, there is shown an inner support consisting of a hollow tube 10 of non-magnetic material, having closely fitted or electro-plated thereover a magnetic covering 11. The tube 10 should be of material which can be bent to a shape which it will retain, and, preferably of electric conductive material, such as brass or copper.

Figure 2:
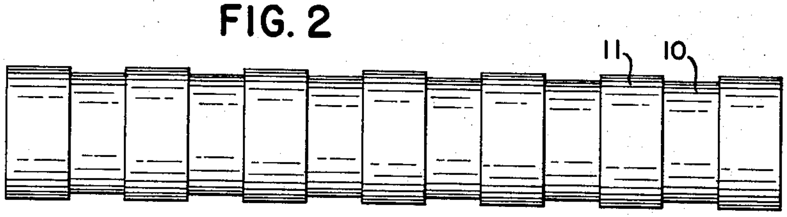
Figure 3:
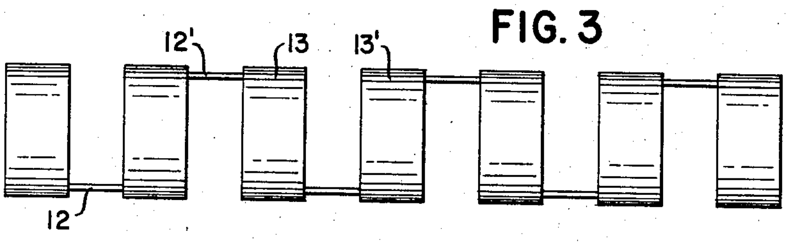

The magnetic covering next is subjected to an operation which gives it the form of Fig. 2, as by grinding or cutting circumferential grooves at spaced intervals in the magnetic covering material until the outer surface of the support tube 10 is exposed.

Next the tube 10 is cut crosswise, at the groove intervals, the cuts being made so that the tube is held together so as to leave bridges such as 12 and 12'. As shown, the adjoining cuts are from diametrically opposite sides, leaving magnetic cores as individual units 13, 13'. As is known, to prevent, as much as possible, unwanted effects in a matrix to be made of these devices, the cores in a row are alternately oriented at right angles. This is done in the present invention by bending the bridges 12, 12', as shown in Fig. 4.

It is not necessary to remove the magnetic material before making the diametrically opposite cuts, as the

2 magnetic material left on the bridges 12 would not interfere with the operation of the cores to any considerable extent.

Figure 4:
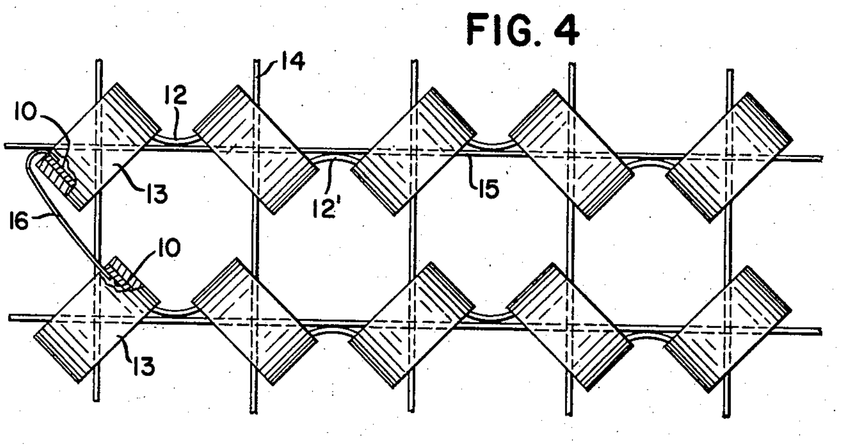
Fig. 4 shows a complete coördinate matrix system of two rows of the devices.

In Fig. 4 there is shown a coordinate matrix of two rows, with five magnetic cores in each row, the matrix being shown with but few cores for the sake of simplicity. There may be as many rows and as many cores in a row as desired.

In the event the supporting material 10 is an electric conductor, adjacent rows may be electrically connected, as by a conductor 16.

It will be seen that the rows and columns of cores shown in Fig. 4 have their holes in straight alinement as to rows and columns, so that electric conductors may be strung through them with ease, the supporting material serving to hold the cores without any other device being necessary, in exact spaced relation. The connector 16 may be of sufficient stiffness to hold the two rows of cores in proper alinement while the conductors 14 and 15 are passed therethrough.

Athough the supporting tube 10 may be covered by magnetic material as by slipping over it a closely fitted tube of magnetic material, the most efficient method of covering the support is by electro-plating magnetic material thereover.

Following is the formula of a satisfactory aqueous magnetic plating solution used at 90° centigrade with a current density of 30–60 amperes per square foot:

50 grams per liter of water of $FeCl_2.4H_2O$
20 grams per liter of water of $NiCl_2.6H_2O$
12 grams per liter of water of $Na_2WO_4.2H_2O$
50 grams per liter of water of $NH_4Cl$
120 grams per liter of water of citric acid ($C_6H_8O_7.H_2O$)
1/10 gram per liter of water of thicurea
Adjusted to pH 8.5 with $NH_4OH$ The plating may be carried on until the desired thickness is obtained.

It is within the scope of the invention to form the tubular support into the connected rings and then magnetically plating them.

What is claimed is:

The method of making a row of spaced magnetic cores on a support, consisting of the steps of covering a non-magnetic tube with magnetic material; removing the magnetic material in spaced circumferential grooves down to the non-magnetic tube; cutting the tube crosswise at each groove to a point where only a narrow bridge is left, the cuts along the tube alternating so the bridges are first on one side of the tube and then the other; and finally bending the bridges so the axes of adjacent cores are at right angles, but in the same plane.

References Cited in the file of this patent

UNITED STATES PATENTS

| | | |
|---|---|---|
| 2,699,597 | Armo | Jan. 8, 1955 |
| 2,792,563 | Rajchman | May 14, 1957 |